(12) United States Patent
Singh

(10) Patent No.: US 6,971,232 B2
(45) Date of Patent: Dec. 6, 2005

(54) HYDRAULIC DRIVE SYSTEM AND IMPROVED CONTROL VALVE ASSEMBLY THEREFOR

(75) Inventor: Rodney V. Singh, Savage, MN (US)

(73) Assignee: Eaton Corporation, Cleveland, OH (US)

( * ) Notice: Subject to any disclaimer, the term of this patent is extended or adjusted under 35 U.S.C. 154(b) by 4 days.

(21) Appl. No.: 10/832,967

(22) Filed: Apr. 27, 2004

(65) Prior Publication Data

US 2005/0016168 A1 Jan. 27, 2005

Related U.S. Application Data

(63) Continuation-in-part of application No. 10/624,805, filed on Jul. 22, 2003, now abandoned.

(51) Int. Cl.[7] .................. F16D 31/02; F16K 31/12
(52) U.S. Cl. .................. 60/414; 251/30.02; 251/43
(58) Field of Search .............. 60/414, 416; 180/165, 180/307; 251/30.02, 43

(56) References Cited

U.S. PATENT DOCUMENTS

| 4,553,732 A | * | 11/1985 | Brundage et al. ............. 251/43 |
| 4,813,510 A | * | 3/1989 | Lexen ........................ 60/414 |
| 5,088,041 A | * | 2/1992 | Tanaka et al. ............. 180/165 |
| 6,719,080 B1 | * | 4/2004 | Gray, Jr. .................... 180/165 |

* cited by examiner

Primary Examiner—Thomas E. Lazo
(74) Attorney, Agent, or Firm—L. J. Kasper

(57) ABSTRACT

A control valve assembly (43) for use in a system in which a pump-motor unit (35) can either receive drive torque from a drive-line (17) or transmit torque thereto. The system includes a high pressure accumulator (41) and the control valve assembly is disposed between the pump-motor unit and the accumulator, and includes a mode valve (45) normally biased closed by pressure in a control cavity (89), the fluid pressure in which is controlled by a pilot valve assembly (49) in response to an electrical signal (133). A step-orifice valve (47) associated with the mode valve poppet member (79) provides a relatively larger orifice (115) into the control cavity (89) when pressure therein is high, and a relatively smaller orifice (119) into the control cavity when pressure therein is low, i.e., when the pilot valve assembly (49) is open. Thus, a large volume of flow can occur from the accumulator to the unit (35) in a motoring mode, with a relatively low pressure drop, while the poppet member is able to have softer, relatively longer opening time, but a relatively faster closing time.

7 Claims, 6 Drawing Sheets

HYDRAULIC DRIVE SYSTEM AND IMPROVED CONTROL VALVE ASSEMBLY THEREFOR

CROSS-REFERENCE TO RELATED APPLICATIONS

This application is a continuation-in-part (CIP) of co-pending application U.S. Ser. No. 10/624,805, filed Jul. 22, 2003 now abandoned, in the name of Rodney V. Singh for a "Hydraulic Drive System And Improved Filter Sub-System Therefor".

BACKGROUND OF THE DISCLOSURE

The present invention relates to hydraulic drive systems of the type including a pump-motor unit which operates as a pump during a portion of the vehicle operating cycle, and as a motor during another portion of the vehicle operating cycle. Even more particularly, the present invention relates to an improved control valve assembly ("mode" valve) for controlling the "mode" of operation of the pump-motor unit, i.e., whether the unit operates in the pumping mode or in the motoring mode.

Although the mode control valve assembly of the present invention may be utilized in hydraulic systems of various types, including such drive systems which effectively serve as the primary vehicle transmission, during most of the vehicle operating cycle, the present invention is especially advantageous when used on a hydraulic drive system which comprises part of a vehicle hydraulic regenerative braking system, and will be described in connection therewith.

In a vehicle hydraulic drive system having regenerative braking capability, and assuming, by way of example only, that the vehicle is of the rear wheel drive type, the primary drive torque is transmitted from the engine through the conventional mechanical transmission, and then by means of a conventional drive-line to the rear drive wheels. During braking (i.e., during the braking portion of a "deceleration-acceleration" cycle,) the kinetic energy of the moving vehicle is converted by a hydrostatic pump-motor unit, which is commanded to operate in its pumping mode, and the pump-motor unit charges (pressurizes) a high pressure accumulator. When the vehicle is subsequently accelerated, the hydrostatic pump-motor unit is commanded to operate in its motoring mode, and the high pressure stored in the high pressure accumulator is communicated to the pump-motor unit. The resulting output torque generated by the pump-motor unit is then transmitted to the vehicle drive-line, to assist in the propelling of the vehicle, and thus, the term "hydraulic assist" is sometimes used in regard to such systems.

As will be understood by those skilled in the art, because the primary reason for providing a regenerative braking system on a vehicle is to improve the overall fuel efficiency of the vehicle, it is important that the hydraulic drive system operate as efficiently as possible. Specifically, it is important that the mode control valve assembly, (which, as mentioned previously, controls whether the pump-motor unit is operating in the pumping mode or in the motoring mode), not be a major source of hydraulic inefficiency. For example, during extensive time periods when the pump-motor unit is at zero displacement, and is de-clutched from the drive-line, it would not be acceptable, in terms of overall system efficiency, to have a continuous pilot flow of pressurized fluid flowing from the mode valve assembly to the system reservoir, hydraulic horsepower, but with no useful function being performed during that time period.

However, it would also not be acceptable, in terms of overall system performance, and specifically, in terms of "responsiveness" (speed of operation), to have a mode control valve in which its opening and closing function would require (at the time its operational state must change) that the system wait for some sort of pilot signal to build sufficient pressure in a chamber to be able to move the main mode valve member between its open and closed positions. Also, because the hydraulic drive system of the invention serves as the main drive for the vehicle, at least during a brief period of time, the control valve assembly must be able to control the flow of a relatively large flow volume, but, a large flow being metered generally implies large pressure drops across the particular valve element, and as noted previously, such large pressure drops in the system would make the overall system unacceptable, in terms of system efficiency.

BRIEF SUMMARY OF THE INVENTION

Accordingly, it is an object of the present invention to provide an improved control valve assembly for use in a hydraulic system, wherein the control valve assembly is able to control relatively large flow volumes at a very fast response time, but with a very small pressure drop across the control valve assembly, and very low quiescent flows.

It is a more specific object of the present invention to provide such an improved control valve assembly, for use as a mode control valve, which is able to control flow in either direction, between a high pressure accumulator and a pump-motor unit.

The above and other objects of the invention are accomplished by the provision of an improved control valve assembly for use in a hydraulic system adapted for use on a vehicle having a drive-line operable to transmit driving torque to a drive axle. The hydraulic system includes a pump-motor unit operable, in a pumping mode, to receive drive torque from the drive-line, and operable, in a motoring mode, to transmit drive torque to the drive-line. A high pressure accumulator is in fluid communication with a first port of the pump-motor unit through the control valve assembly whereby, when the pump-motor unit is in the pumping mode, pressurized fluid is communicated from the first port to the high pressure accumulator. When the pump-motor unit is in the motoring mode, pressurized fluid is communicated from the high pressure accumulator to the first port. The control valve assembly includes a valve housing defining a poppet seat and a port in fluid communication with the accumulator.

The improved control valve assembly is characterized by a main poppet member defining a control cavity, fluid pressure in the control cavity biasing the main poppet member toward the poppet seat. Substantially all flow between the high pressure accumulator and the first port of the pump-motor unit flows past the main poppet member and the poppet seat in either of the pumping mode or the motoring mode. A pilot valve assembly has open and closed conditions and is operable to control fluid communication from the control cavity to a source of low pressure, in response to an electrical input signal. A step-orifice valve assembly is operable to control fluid communication from the accumulator through the port, defined by the valve housing, to the control cavity, and defines a first, relatively larger flow orifice when fluid pressure in the control cavity is relatively high, and a second, relatively smaller flow orifice when fluid pressure in the control cavity is relatively low, to provide a relatively small flow to said pilot valve assembly.

DETAILED DESCRIPTION OF THE PREFERRED EMBODIMENT

Figure 1:
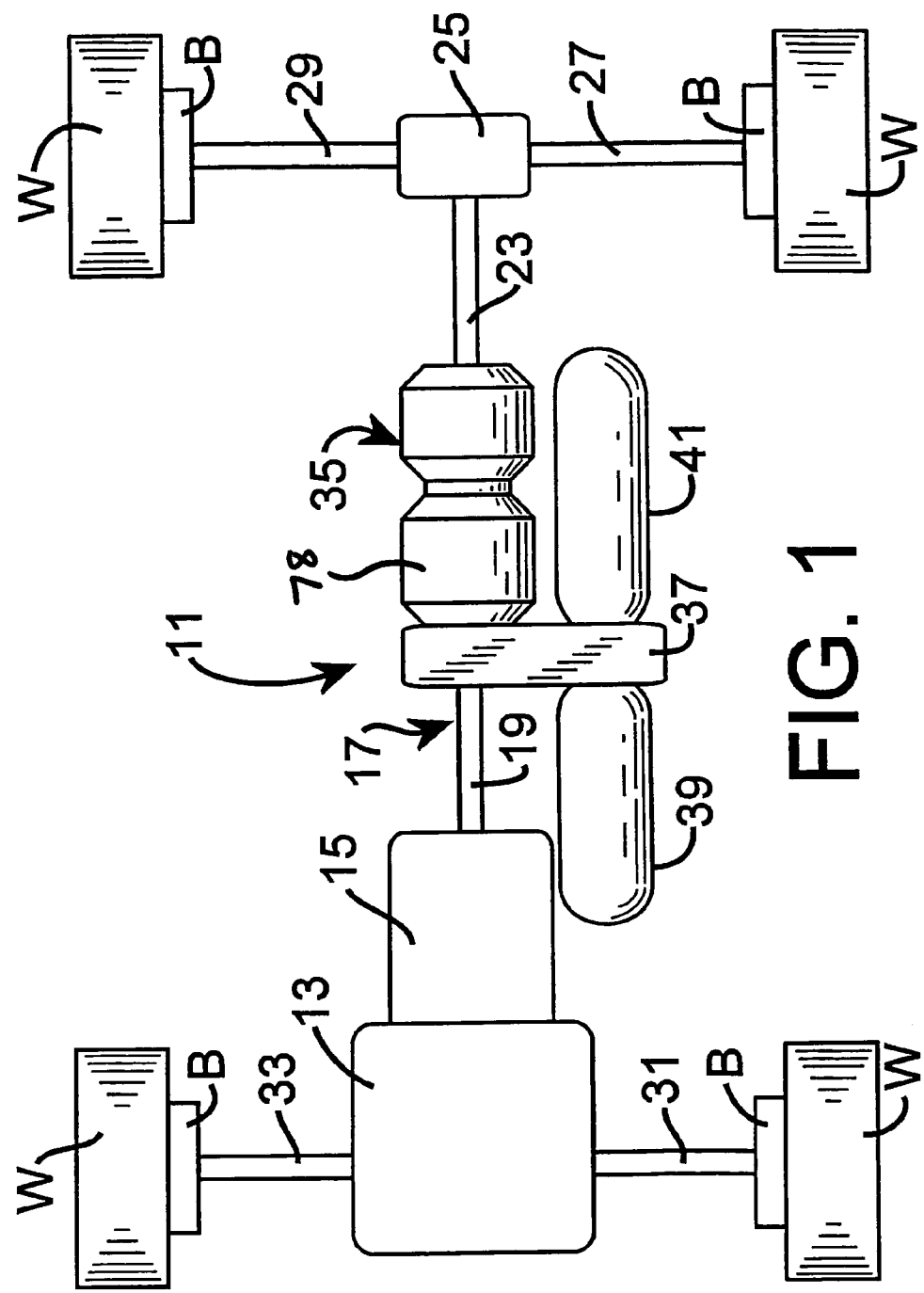
FIG. 1 is a schematic view of an entire vehicle drive system of the type with which the hydraulic drive system and the mode control valve assembly of the present invention is especially well suited.

Referring now to the drawings, which are not intended to limit the invention, FIG. 1 illustrates a vehicle drive system of the type for which the hydraulic drive system of the present invention is especially well suited. The vehicle system shown schematically in FIG. 1 has four drive wheels W, although it should be understood that the present invention is not limited to a vehicle having four-wheel drive (or even four drive wheels), but could also be used with a vehicle having only two-wheel drive, and in that case, the two drive wheels could be either rear drive wheels or front drive wheels. Operably associated with each of the drive wheels W could be a conventional type of wheel brake B, the details of which form no part of the present invention, and the wheel brakes B will be referred to only briefly hereinafter. Preferably, the wheel brakes B are part of an overall EHB (electro-hydraulic brake) system, of the type which is just now becoming well known to those skilled in the art, and commercially available.

The vehicle includes a vehicle drive system, generally designated 11, which includes a vehicle engine 13 and a transmission 15. It should be understood that the particular type of engine 13 and transmission 15 and the construction details thereof, as well as the drive system arrangement, etc., form no part of the present invention, except to the extent specifically recited in the appended claims, and therefore, will not be described further herein. Furthermore, the present invention is not even limited specifically to use with what is normally thought of as an "engine", and therefore, it will be understood that, within the scope of the invention, references to an "engine" will mean and include any type of power source or other prime mover. Finally, although the hydraulic system of the present invention is illustrated and described in connection with a vehicle drive system, it should be understood by those skilled in the art that the invention may be utilized advantageously with any sort of hydraulic system of the type illustrated and described hereinafter, whether or not such system is part of a vehicle.

Extending rearwardly from the transmission 15 is a drive-line, generally designated 17. In the subject embodiment, and by way of example only, the drive-line 17 includes a forward drive shaft 19, an intermediate drive shaft (not visible herein), and a rearward drive shaft 23, an inter-wheel differential 25 and left and right rear axle shafts 27 and 29. Those skilled in the art will understand, from a subsequent reading and understanding of the present specification, that the drive-line 17 has been illustrated and described as comprising the shafts 19 and 23 primarily to facilitate understanding of the overall vehicle drive system 11, and not by way of limitation.

Referring still primarily to FIG. 1, the drive system 11, in the subject embodiment, also includes left and right forward axial shafts 31 and 33, respectively. In addition to the "mechanical" elements already described, and which are fairly conventional, the drive system 11 also includes a hydrostatic pump-motor unit, generally designated 35, and disposed forwardly of the pump-motor unit 35 is a valve manifold 37. Attached to a forward portion of the valve manifold 37 is a low pressure accumulator 39, and attached to a rear portion of the valve manifold 37 is a high pressure accumulator 41. However, it should be understood by those killed in the art, that the particular arrangement could be reversed, or changed in some other manner. It should also be understood that the particular design and details of the valve manifold 37 (except to the extent noted hereinafter) and the accumulators 39 and 41 are not essential features of the present invention, and therefore, not all of the construction details are illustrated and described herein. Instead, the general function and operation of each will be described briefly, in connection with the hydraulic system schematic of FIG. 2, but then only to the extent necessary to describe the several operating modes of the hydraulic drive system as background and "environment" for the explanation of the mode control valve assembly of the present invention.

Figure 2:
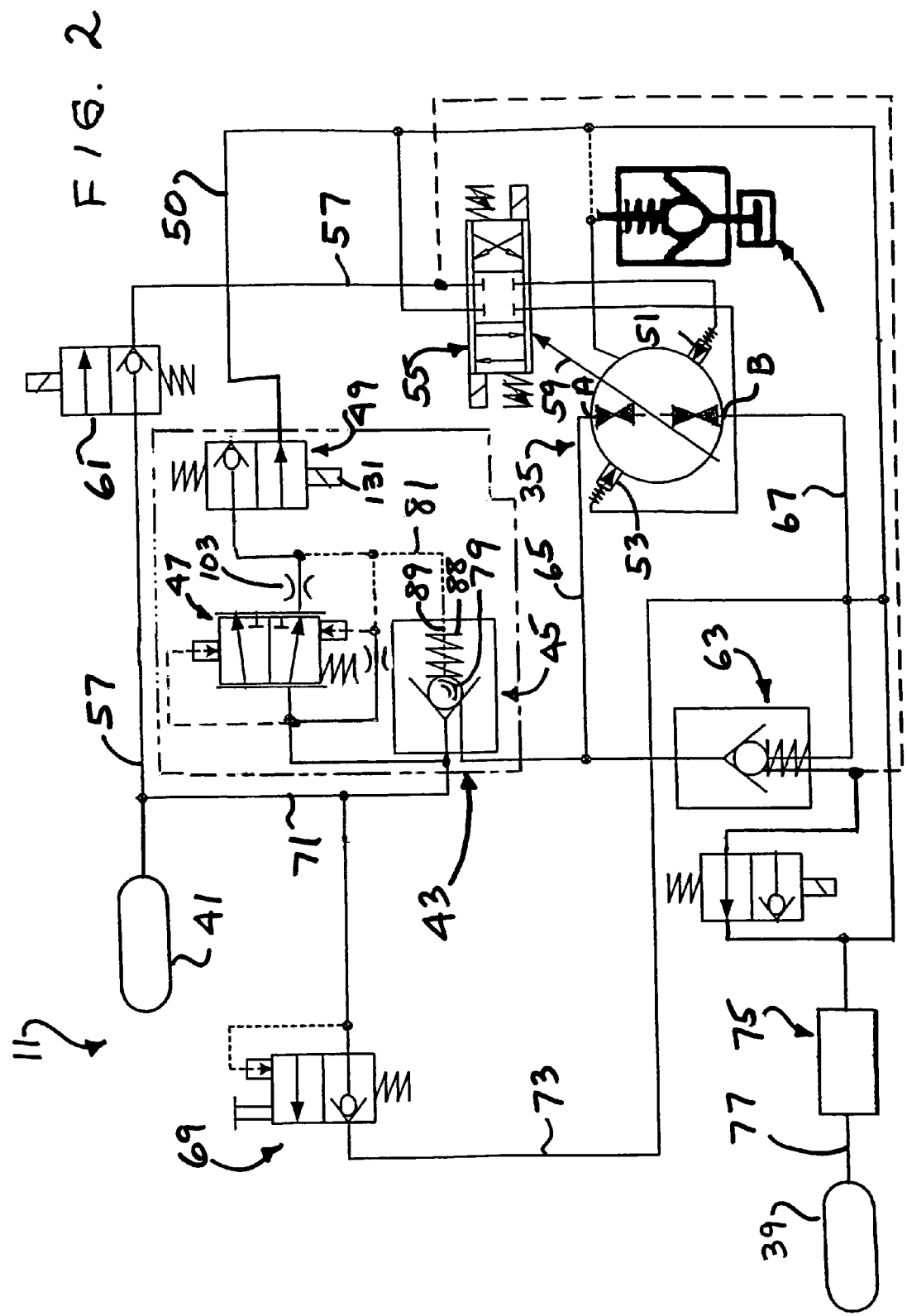
FIG. 2 is a hydraulic schematic of the hydraulic drive system shown in FIG. 1, including the control circuit and the mode control valve assembly of the present invention.

Referring now primarily to FIG. 2, it should be understood that, other than the pump-motor unit 35 and the two accumulators 39 and 41, everything else shown in the hydraulic schematic of FIG. 2 would typically be included within the valve manifold 37, or attached to the valve manifold 37. It should also be understood that, whenever the pump-motor unit 35 is in its neutral (zero displacement) condition (which is the case whenever the vehicle is not in a deceleration-acceleration cycle), there is no substantial flow within the hydraulic system shown in FIG. 2, between the pump-motor unit 35 and the two accumulators 39 and 41. However, as is well known to those skilled in the art of such systems, because of the pre-charge on each of the accumulators 39 and 41, as will be discussed in greater detail subsequently, the system remains "pressurized" even while the pump-motor unit 35 is in its neutral condition.

The hydraulic system (as shown in FIG. 2), which is included within the valve manifold 37, includes a control valve assembly, generally designated 43, which includes a mode control valve 45. Operably associated with (incorporated into) the mode control valve 45 is a step-orifice control valve 47, and a solenoid-type mode pilot valve 49, the outlet of which is in communication with a source of low pressure (such as a reservoir, or merely the low pressure side of the system) by means of a conduit 50. The function and operation of the valves 43, 45, 47 and 49 will be described in much greater detail subsequently, especially in connection with the description of FIGS. 3 through 6, and in connection with the explanation of the essential features of the present invention.

The pump-motor unit 35 is of the variable displacement type, and therefore, includes some sort of displacement-varying means, such as a pair of fluid pressure servo actuators (stroking cylinders) of the type shown in FIG. 2 and designated 51 and 53. The servo actuators 51 and 53 are connected, hydraulically, to the outlets of a typical electro-hydraulic controller 55. The function of the controller 55 is to communicate pressurized fluid from a conduit 57 to one of the servo actuators 51 or 53, as appropriate to achieve the desired angle and displacement of a swashplate 59, all of which is generally well known to those skilled in the pump and motor art, and especially, in the axial piston pump art. Those skilled in the art of hydraulic drive systems of the type to which the present invention relates will understand that, like typical HST (hydrostatic transmission) systems, there can be mechanical feedback from the swashplate 59 of the pump-motor unit 35 to the controller 55. Preferably, however, feedback to the controller 55 is achieved electronically in the subject embodiment, including even the indication of the position of the swashplate 59. It should be understood that any functionally satisfactory type of feedback is within the scope of the present invention.

Disposed in series between the high pressure accumulator 41 and the electro-hydraulic controller 55 is an isolation valve 61 which, as shown in FIG. 2, is preferably a poppet-type valve which is solenoid operated. Whenever the hydraulic drive system 11 is operating, the isolation valve 61 is "ON", i.e., high pressure is freely communicated from the high pressure accumulator 41 to the controller 55. Whenever the hydraulic drive system 11 is "OFF", the isolation valve 61 is spring biased to the position shown in FIG. 2, in which the valve 61 keeps the pump-motor unit 35 and the controller 55 "isolated", hydraulically, from the high pressure accumulator 41, so that the accumulator 41 does not "leak down" through the controller 55, while the system is not operating. References herein to the drive system being "OFF" will be understood to mean and include both that portion of the vehicle operating cycle when the vehicle is not in a deceleration-acceleration cycle, as well as those times when the vehicle is not operating at all (engine "off" condition).

Referring still primarily to FIG. 2, the drive system 11 includes a bypass valve assembly, generally designated 63, which may also be referred to as an "unloading" valve or as a "dump" valve, as those terms are well understood in the valve art. Thus, the bypass valve assembly 63 will "unload" the pump-motor unit 35 whenever the engine is "off" (no driving pressure present in the conduit 57, or in conduit 65), so that there is no unintended torque transmitted to the drive-line 17 (see FIG. 1). It is believed to be within the ability of those skilled in the art to determine the specific design and operation of a particular sub-system, such as the bypass valve assembly 63, neither the specific details of which, nor even the presence of, form an essential part of the present invention.

The hydraulic drive system 11 also includes a relief valve, generally designated 69 which, as is shown in FIG. 2, is spring biased to a closed position. An inlet of the relief valve 69 is in communication with a conduit 71, which interconnects the inlet of the relief valve 69 with the port of the high pressure accumulator 41, and with the inlet of the mode control valve 45. Whenever the pressure in the conduit 71 exceeds a predetermined maximum, the relief valve 69 is biased (moved "downward" in FIG. 2) to a position which permits communication from the conduit 71 to a conduit 73 (which may be considered as the "low pressure" side of the system, as will become more apparent subsequently). Finally, referring still to FIG. 2, the hydraulic drive system 11 includes a filter circuit, generally designated 75, which will not be described in greater detail subsequently, but is described in the above-identified parent application U.S. Ser. No. 10/624,805. The filter circuit 75 is in communication with the port of the low pressure accumulator by means of a conduit 77.

Referring still primarily to FIG. 2, it may be seen that the pump-motor unit 35 includes a port (designated "A") which is connected by means of the conduit 65 to the mode control valve 45. The pump-motor unit 35 also includes another port (designated "B") which, by means of the conduit 67, is in fluid communication with the filter circuit 75, and also with the conduit 73, such that the conduits 50, 67, and 73 together comprise the "low pressure" side of the system, as was mentioned previously. As will be seen from the subsequent description, when the pump-motor unit 35 is in the pumping mode, the port A is the pressurized, outlet port (see arrows in pump symbol in FIG. 2), and when the unit 35 is in the motoring mode, the port A is the pressurized, inlet port and the port B is the exhaust, outlet port.

The general operation of the hydraulic drive system 11 will be described briefly, just by way of background. As was mentioned previously, when the vehicle is neither decelerating or accelerating, the pump-motor unit 35 is de-clutched, by means of a clutch assembly 78 (see FIG. 1, in which the clutch assembly 78 would be operable between the pump-motor unit 35 and the intermediate drive shaft). In this condition, with the pump-motor unit de-clutched from the intermediate drive shaft, the overall vehicle drive system shown in FIG. 1 operates in the same manner as if the hydraulic drive system 11 were not present.

When the vehicle operator begins to perform a braking operation, one result is that the clutch assembly 78 is actuated, such that the pump-motor unit 35 is now clutched to the drive-line 17 (i.e., to the intermediate drive shaft), and an appropriate command signal is provided to the electro-hydraulic controller 55, displacing the swashplate 59 in a direction such that the rotation of the drive-line 17 (with the vehicle moving in a forward direction) causes the pump-motor unit 35 to pump pressurized fluid from the port A to the conduit 65. As is now well known to those skilled in the art of hydraulic regenerative braking systems, the displacement of the swashplate 59 (and therefore, the fluid output per rotation of the drive-line 17) is typically proportional to the extent to which the vehicle operator depresses the brake pedal. It is now known to those skilled in the art how to set the displacement of the swashplate 59 proportional to the brake torque applied by the operator, or to the displacement of the brake pedal, although the particular means, or criteria, selected for setting the displacement of the swashplate 59 is not essential to the present invention.

With the pump-motor unit 35 in the pumping mode, pressurized fluid communicated through the conduit 65 unseats a poppet member 79 in the mode control valve 45, such that the pressurized fluid flows into the conduit 71, and from there, pressurizes the high pressure accumulator 41. In the subject embodiment, and by way of example only, the high pressure accumulator 41 is of the gas-charge type. A hydraulic pressure is necessarily maintained, within the accumulator 41, such that a minimum amount of oil is always retained in the high pressure accumulator 41 (such that there is always a predetermined, minimum charge pressure within both of the conduits 57 and 71). At the end of a typical deceleration cycle, the high pressure accumulator 41 is charged up to the maximum system pressure, typically about 5000 psi, but possibly, even higher.

At the completion of the deceleration portion of the braking cycle, when the vehicle operator releases the brake pedal and subsequently begins to depress the accelerator, an appropriate signal is communicated to the electro-hydraulic controller 55 which commands the pump-motor unit 35 to transition from the pumping mode (described previously), to the motoring mode. In the motoring mode, the swashplate 59 is disposed at an inclination opposite that which existed when the unit was in the pumping mode (i.e., the swashplate 59 goes "over-center"). When the pump-motor unit 35 is in the motoring mode, the swashplate 59 is displaced such that flow through the pump-motor unit 35 (from port A to port B) will cause the pump-motor unit 35 to transmit torque to the drive-line 17, tending to drive the drive-line 17 in a direction corresponding to the same forward movement in which the vehicle is already engaged. In the subject embodiment, and by way of example only, the mode control valve 45 is constructed such that pressurized fluid can always flow from the conduit 65 to the conduit 71 (i.e., the pumping mode). However, only when the mode pilot valve 49 receives an appropriate input signal to its solenoid is there an appropriate pilot signal 81 which assists in the opening of the poppet member 79, to permit relatively unrestricted flow of high pressure fluid from the accumulator 41 through the conduit 71, and then through the conduit 65 to the port A (inlet port in motoring mode) of the pump-motor unit 35.

Figure 3:
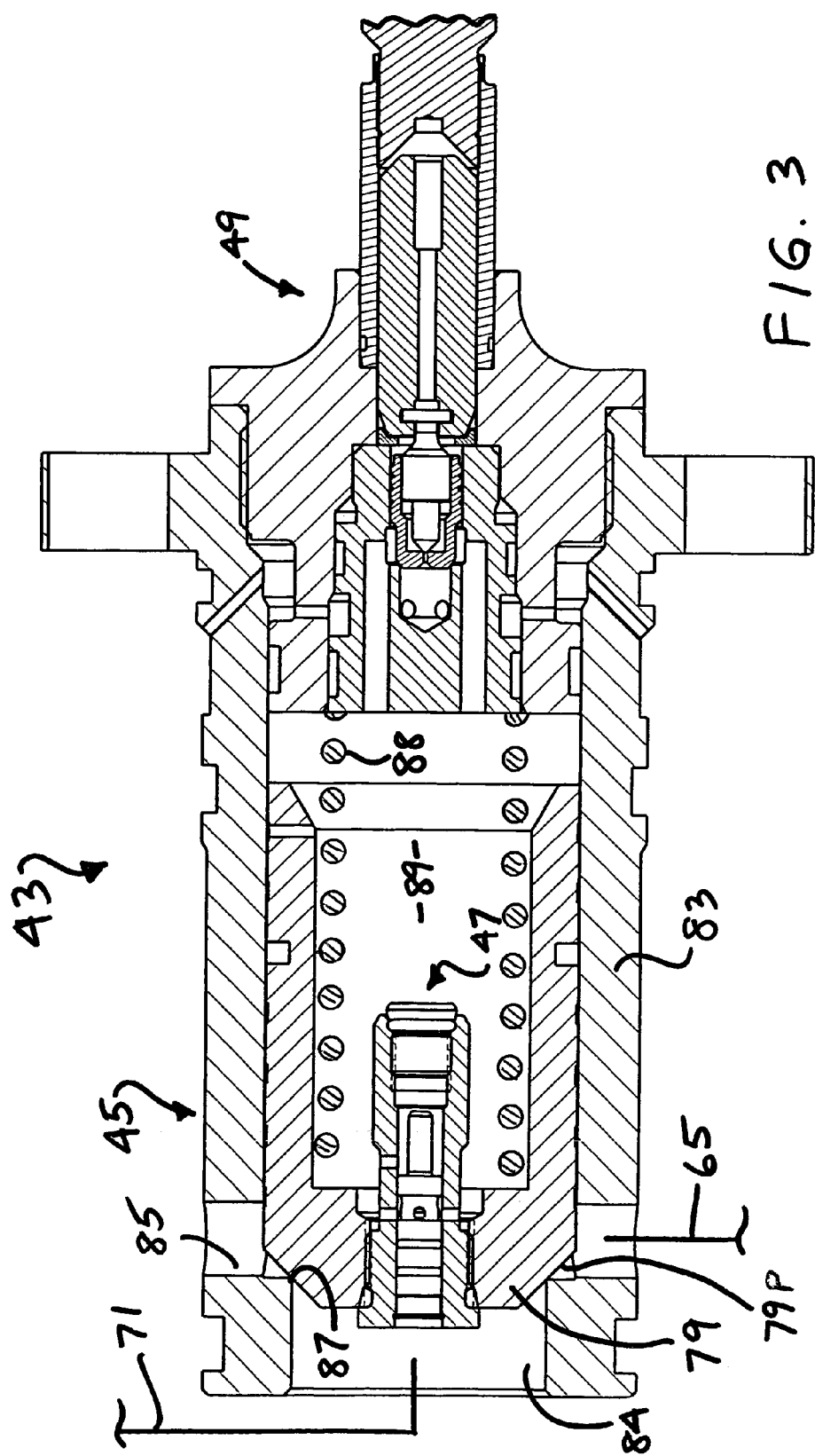
FIG. 3 is an axial cross section of the entire control valve assembly of the present invention, with the mode valve poppet in its closed position.

Referring now primarily to FIG. 3, but in conjunction with FIG. 2, the control valve assembly 43 will be described in greater detail. Although not an essential feature the present invention, it may be seen that the entire control valve assembly 45 is shown in FIG. 3 as comprising a cartridge-style valve and, by way of example only, the cartridge shown in FIG. 3, and comprising the control valve assembly 43, would be disposed within the housing of the valve manifold 37. The left end (as seen in FIG. 3) of the control valve assembly 43 comprises the mode control valve 45, including the poppet member 79, shown schematically (as a ball) in FIG. 2. Operably associated with the poppet member 79 is the step-orifice control valve 47, also shown schematically in FIG. 2. Disposed toward the right end of the control valve assembly 43 is the solenoid operated, mode pilot valve 49, also shown schematically in FIG. 2.

The control valve assembly 43 includes a generally cylindrical housing or body 83, which is in open fluid communication, at its left end, by means of a port 84, with the conduit 71 which in turn is connected to the port of the high pressure accumulator 41 (see FIG. 2). The body 83 defines a plurality of radially extending ports 85, and it is by means of the ports 85 that the mode control valve 45 is in fluid communication, through the conduit 65, with the port A of the pump-motor unit 35 (see FIG. 2). The body 83 defines a poppet seat 87, against which the poppet member 79 is biased, toward its closed position, as shown in FIG. 3, by means of a relatively light compression spring 88. The poppet member 79 defines (in cooperation with the body 83 and the mode pilot valve 49) a control cavity 89, and it should be understood that, in accordance with one aspect of the present invention, poppet member 79 is hydraulically biased toward its closed position in FIG. 3 primarily by the fluid pressure in the control cavity 89, as will be explained in greater detail subsequently.

Figure 4:
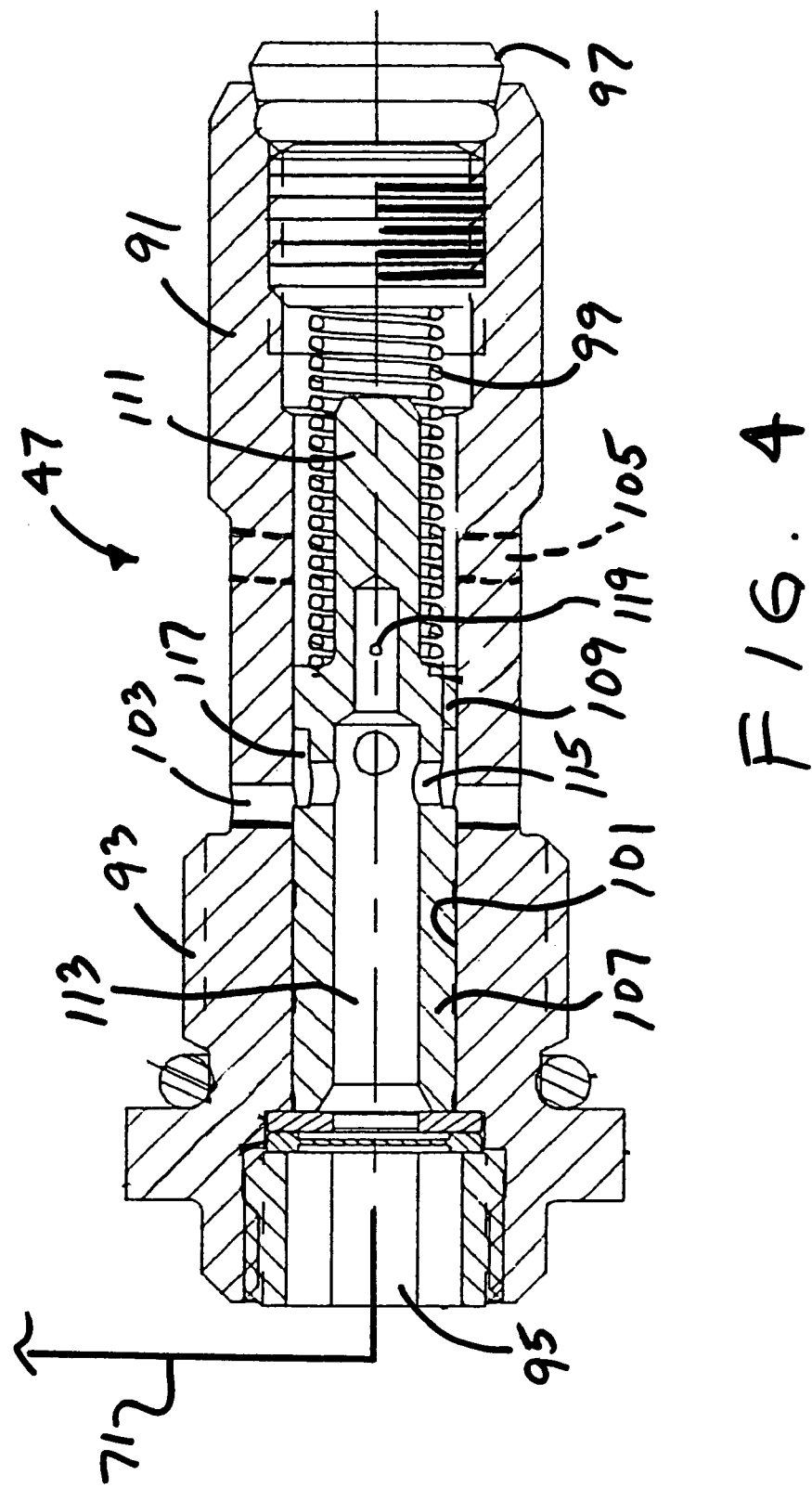
FIG. 4 is an enlarged, axial cross section of the step orifice control valve assembly, shown generally in FIG. 3.

Referring now primarily to FIG. 4, the step-orifice control valve 47 will be described in greater detail. The control valve 47 comprises a valve body 91 which is externally threaded, as designated at 93, so that the entire step-orifice control valve 47 may be threaded into the position shown in FIG. 3, within the poppet member 79. The valve body 91 defines an inlet 95 (at its left end in FIG. 4) in open communication with the conduit 71, through the port 84. Disposed at the opposite axial end of the valve body 91 is an externally threaded fitting 97, the function of which is to serve as a seat for a compression spring member 99.

The valve body 91 defines an axially-extending bore 101, and two sets of radially-extending ports 103 and 105 (ports 105 being on a different plane in FIG. 4, and being shown by dashed lines). As may best be seen in FIG. 3, both sets of the ports 103 and 105 (not bearing reference numerals in FIG. 3) provide fluid communication from the bore 101 to the control cavity 89. Disposed within the bore 101 is a valve spool 107 including a land 109, disposed in FIG. 4 just to the left of a reduced diameter portion 111, about which is disposed a major portion of the compression spring member 99. The valve spool 107 defines a central bore 113 which is in open communication through a plurality of radial holes 115 with an outer annual grove 117. In the position of the valve spool 107 shown in FIG. 4, the central bore 113 is in open fluid communication, through the radial holes 115 and the annual groove 117, with the ports 103. The central bore 113 has, toward its right end in FIG. 4, a reduced diameter portion including one small orifice 119, by means of which fluid may be communicated from the central bore 113 into the bore 101, but to the right of the land 109, for reasons which will be described subsequently.

Figure 5:
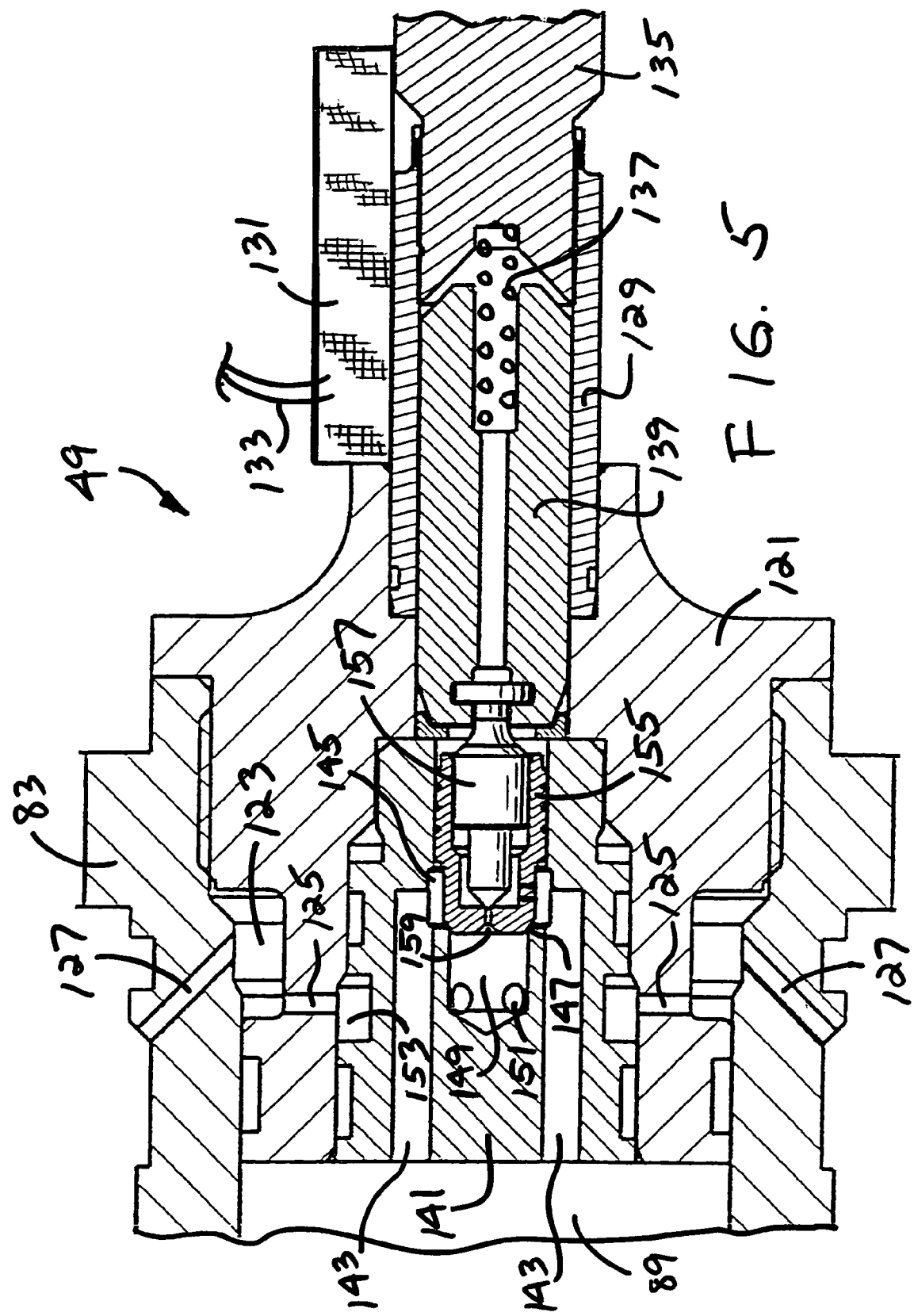
FIG. 5 is an enlarged, axial cross section of the solenoid operated mode pilot valve assembly, also shown in FIG. 3, and shown in FIG. 5 in its normal, closed position.

Referring now primarily to FIG. 5, disposed within the right end of the body 83 is the mode pilot valve 49, and having a support member 121 in threaded engagement with the right end of the body 83, to define therebetween an annular fluid chamber 123. The annular fluid chamber 123 is in open fluid communication with a plurality of radially-extending passages 125, while the body 83 defines a plurality of angled passages 127, also in open communication with the annular chamber 123. The angle passages 127 communicate (either directly or indirectly), with the conduit 50 (see FIG. 2) and therefore, with the low pressure side of the system, for reasons which will become apparent subsequently.

Received within the right end of the support member 121 is a bobbin 129, about which is disposed an electro-magnetic coil 131 (only the upper half being shown in FIG. 5), which receives an appropriate electrical input signal by means of a pair of electrical leads, shown schematically at 133. References hereinafter to the electrical input signal to the coil 131 will also bear the reference numeral "133". The right end (in FIG. 5) of the bobbin 129 is suitably attached to a support member 135 (shown only fragmentarily herein), which serves as a seat for a compression spring 137. The spring 137 biases an armature member 139 toward its extreme, leftward position (the position shown in FIG. 5) in the absence of the coil 131 being energized ("ON") by means of an appropriate signal 133.

Disposed within the left end (in FIG. 5) of the support member 121 is a valve body 141 defining a plurality of axially-extending fluid passages 143, which are an open fluid communication with the control cavity 89. As described previously, it is primarily the fluid pressure differential across the poppet member 79 which determines the position of the poppet member 79. The fluid passages 143 open into an annular chamber 145, the forward end of which (left end in FIG. 5) forms a poppet seat 147. Disposed radially inward from the poppet seat 147 is a chamber 149, and in communication therewith, a plurality of radially-extending passages 151 which open into an annular chamber 153, disposed about the outside of the valve body 141. As may be seen in FIGS. 5 and 6, the annular chamber 153 is in open communication with the radially-extending fluid passages 125, and therefore, the chamber 149 is in relatively open fluid communication with the low pressure side of the system, as described previously.

Figure 6:
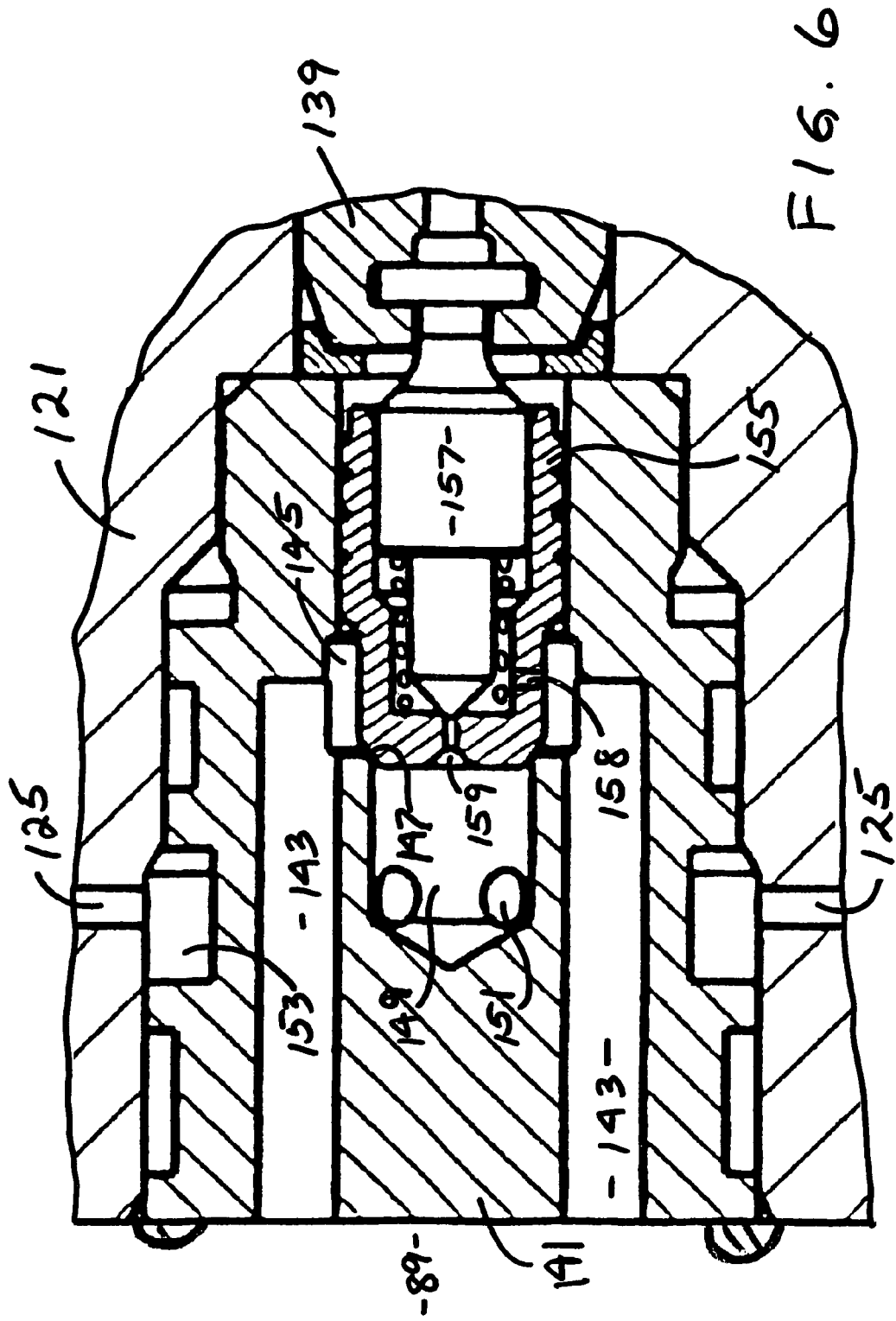
FIG. 6 is a further enlarged, fragmentary, axial cross-section of a portion of the mode pilot valve assembly shown in FIG. 5.

Disposed within a central bore defined by the valve body 141 is a poppet member 155, normally biased to a closed position against the poppet seat 147, i.e., the position shown in FIGS. 5 and 6. Disposed within the poppet member 155 is a poppet plunger 157 which is fixed by having its right hand end trapped within a mating opening in the armature member 139, such that the poppet plunger 157 moves axially with the armature member 139. The forward end (left end in FIGS. 5 and 6) of the poppet member 155 defines one small pilot flow opening 158 (reference numeral appearing only in FIG. 6), which permits fluid communication from the annular chamber 145 into an annular chamber disposed radially between the interior of the poppet member 155 and the reduced diameter portion of the poppet plunger 157. When an appropriate signal 133 is transmitted to the coil 131, the armature 139 is pulled to the right in FIG. 5, overcoming the force of the spring 137, such that the poppet plunger 157 moves to uncover an axially extending pilot passage 159 (which is preferably larger than the pilot flow opening 158), permitting fluid communication from the interior of the poppet member 155 through the pilot passage 159 and out the path previously described to the low pressure side of the system. Once the above-described pilot flow through the pilot passage 159 occurs, the "holding" pressure behind the poppet member 155 is reduced to low pressure, thus causing the poppet member 155 to move to the right in FIGS. 5 and 6, opening up relatively unrestricted fluid communication from the annular chamber 145, past the poppet seat 147 and out the radially-extending passages 151, to the low pressure side of the system. The fluid communication just described causes the pressure in the control cavity 89 to drop to approximately that of the low pressure side of the system.

The operation of the control valve assembly 43 of the present invention will now be described in somewhat greater detail. Whenever the hydraulic drive system 11 is "OFF", as described previously in regard to FIG. 2, the high pressure accumulator 41 contains pressurized fluid at what is referred to as its "low state" (e.g., at a pressure of about 3,000 psi). That same fluid pressure would be present in the conduit 57, between the accumulator 41 and the isolation valve 61 and would also be present in the conduit 71, between the accumulator 41 and the mode control valve 45. In the OFF or neutral condition, the signal 133 being communicated to the electro-magnetic coil 131 is "off" so that the coil 131 is de-energized, and therefore, the mode pilot valve 49 is in the closed condition of FIG. 5 (and as shown schematically in FIG. 2). With the mode pilot valve 49 blocking communication from the control cavity 89 to the low pressure side of the system, the pressure in the control cavity 89 is substantially equal to that in the conduit 71, and the valve spool 107 is biased to the left-most position, as shown in FIG. 4. In this position of the step-orifice control valve 47, the pressure in the control cavity 89 is maintained at substantially the pressure in the fluid conduit 71, because those two locations are in open fluid communication with each other through both a first, relatively larger flow orifice (the cumulative area of the radial holes 115) as well as through the second, relatively smaller flow orifice 119.

As may best be seen in FIG. 3, with the fluid pressure in the conduit 71 and in the control cavity 89 being substantially equal, the poppet member 79 is maintained in its closed position, biased against the poppet seat 87, because the total area subjected to the fluid pressure in the control cavity 89 is greater than the total area subjected to the fluid pressure in the conduit 71 and the port 84 (i.e., the area radially inward from the poppet seat 87). This is one important aspect of the present invention. The fact that, in either the OFF mode or in the pumping mode, the step-orifice control valve 47 insures that the fluid pressure in the control cavity 89 is substantially equal to that in the conduit 71 is another important aspect of the present invention.

If the vehicle operator begins to depress the brake pedal, an appropriate signal is sent from the vehicle microprocessor to the solenoid of the isolation valve 61, moving it downward in FIG. 2 and opening fluid communication from the high pressure accumulator 41 to the controller 55. This results in moving the swashplate 59 to an appropriate position, such that the pump-motor unit 35 begins to pump fluid from port A through the conduit 65. As may best be seen in FIG. 3, the pressure generated by the pump-motor unit 35 (as a result of the braking operation) acts on the area of the poppet member 79 which is disposed radially outward from the poppet seat 87, this area being designated in FIG. 3 as "79P". The pumped pressure, acting on the area 79P, overcomes the net pressure balance (described previously) tending to hold the poppet member 79 in its closed position of FIG. 3. By way of example only, in the system being developed, by the assignee of the present invention, when the pressure in the ports 85 is about 35 psi. (the equivalent force of the spring 88) greater than the fluid pressure in the conduit 71 and control chamber 89, the poppet member 79 is unseated and moves to the right in FIG. 3 to an open position. However, it should be understood that, in the pumping mode, the poppet member 79 just barely opens enough to charge the high pressure accumulator 41.

Thus, the pressurized fluid pumped from port A of the pump-motor unit 35 flows through the conduit 65, then through the ports 85 (unseating the poppet member member 79) and past the poppet seat 87, then out through the port 84 and through the conduit 71 to the port of the high pressure accumulator 41, thus charging the accumulator 41. The extent to which the accumulator 41 is charged depends on various factors such as the braking effort by the vehicle operator and the inertia of the vehicle, considering both the braking force (or travel) as well as the duration of the braking event. In the system being developed by the assignee of the present invention, and by way of example only, the accumulator would be pumped up, during the braking event, from the low state pressure of about 3000 psi. as mentioned previously, to the "high" system pressure, about 5000 psi. in this example.

In accordance with a further important aspect of the present invention, the poppet member 79 permits flow of pressurized fluid from the pump-motor unit 35 to the high pressure accumulator 41 in the manner just described, but as soon as the braking effort ceases, and the fluid pressure in the conduit 65 decreases, the poppet member 79 functions as a pilot-operated "check valve", under the influence of the fluid pressure in the control cavity 89, and the force of the spring 88, tending to bias the poppet member 79 toward its closed position, shown in FIG. 3. The poppet member 79 thereafter functions as a check valve, to block "reverse" flow (i.e., flow from the conduit 71 to the conduit 65) because, during the operation of the mode control valve 45 in the pumping mode, the step-orifice control valve 47 remains in the "large orifice" condition shown in FIG. 4, and described previously, i.e., the pressure in the control cavity 89 remains substantially the same as the pressure in the conduit 71 and port 84. Thus, the total force of the spring 88 and the hydraulic balancing force on the unequal areas of the poppet member 79 (as previously described) provides the net biasing force to maintain the poppet member 79 closed.

After the deceleration (braking) portion of the deceleration-acceleration cycle, when the vehicle operator depresses the throttle to begin to accelerate the vehicle, the vehicle microprocessor sends appropriate signals to several portions of the entire control system shown in FIG. 2. First, an appropriate signal is communicated to the electro hydraulic controller 55, such that the pump-motor unit 35 is now driven "over-center" as mentioned previously, i.e., the swashplate 59 will now be displaced at a tilt angle which is opposite to the angle of the swashplate 59 when the unit 35 was in the pumping mode. Secondly, an appropriate signal 133 is transmitted to the electro-magnetic coil 131, retracting the armature member 139, in opposition to the force of the spring 137, as described previously. The mode pilot valve 49 thus opens fluid communication from the control cavity 89 to the low pressure side of the system, dropping the pressure within the control cavity 89 to substantially that of the low pressure side of the system.

With low pressure in the control cavity 89, there is also low pressure communicated through the radially-extending ports 105, into the bore 101, to the right of the land 109. As a result, now it is only the compression spring member 99 which is biasing the valve spool 107 toward the left in FIG. 4. At the same time, tending to bias the valve spool 107 to the right in FIG. 4 is the full system pressure instantaneously present in the high pressure accumulator 41, and present in the conduit 71 and in the port 84, the inlet 95, and in the central bore 113. Therefore, the much greater force tending to bias the valve spool 107 to the right biases the valve spool 107 from the position shown in FIG. 4 overcoming the force of the spring 99, until the annular grove 117 is no longer in communication with the ports 103, i.e., the "relatively large" orifice is now closed, and only the "relatively smaller" orifice 119 is open. In other words, the only flow into the control cavity 89 is that which flows through the relatively small orifice 119, then through the ports 105 into the control cavity 89. Preferably, the flow area of the orifice 119 is much less than the effective flow area through the mode pilot valve 49 (with the poppet member 155 open, as described previously), and no substantial pressure builds up within the control cavity 89 as a result of the flow through the small orifice 119.

With the control valve assembly 43 in the condition described above, the high pressure contained in the conduit 71 will easily and quickly overcome the force of the low pressure in the control cavity 89 plus the force of the spring 88 and bias the poppet member 79 to the right from the normal, closed position shown in FIG. 3, opening up substantially unrestricted fluid communication from the conduit 71, through the port 84, then out through the ports 85 and through the conduit 65 to the port A of the pump-motor unit 35, with port A now serving as the inlet port and the unit 35 now operating as a motor. Whereas, in the pumping mode, the poppet member 79 just barely opens, as described previously, when the unit 35 is in the motoring mode, the poppet member 79 is wide open, and typically, the right end of the poppet member 79 would engage the adjacent surface of the support member 121.

Thus, it may be seen that with the control valve assembly 43 of the present invention, when the hydraulic drive system 11 operates in the motoring mode, the mode control valve 45 quickly provides a large volume of fluid communication from the accumulator 41 to the pump-motor unit 35, with very little pressure drop across the control valve assembly. By way of example only, it has been determined that in the embodiment of the present invention being developed, with the high pressure accumulator 41 being charged to approximately 5,000 psi, the mode control valve 45 communicates to the pump-motor unit 35 a flow of approximately 150 gpm, with a pressure drop across the mode control valve 45 of approximately 10 psi. During the operation in the motoring mode, another important aspect of the invention is that the only "non-functional" hydraulic energy being consumed is the very small pilot flow, as determined by the area of the small orifice 119.

One other very important aspect of the step-orifice arrangement of the present invention is that when the poppet member 155 of the mode pilot valve 49 is closed (signal 133 is turned "OFF"), the fluid pressure build-up in the control cavity 89 is accelerated by the shifting of the valve spool 107 back to the left, to the position shown in FIG. 4. Such movement of the valve spool 107 occurs under the influence of the relatively strong spring 99, and causes the central bore 113, annular groove 117, and ports 103 to communicate relatively unrestricted flow of pressurized fluid from the accumulator 41 into the control cavity 89. This rapid communication of pressure into the control cavity 89 causes the poppet member 79 to return to its closed position (FIG. 3), and shut off flow from the accumulator 41 to the port A (inlet port) of the unit 35, much faster than if the step-orifice control valve 47 were not present.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A control valve assembly for use in a hydraulic system adapted for use on a system having a drive-line operable to transmit driving torque to a drive axle, said hydraulic drive system including a pump-motor unit operable, in a pumping mode, to receive drive torque from said drive-line, and operable, in a motoring mode, to transmit drive torque to said drive-line; a high pressure accumulator in fluid communication with a first port of said pump-motor unit through said control valve assembly whereby, when said pump-motor unit is in said pumping mode, pressurized fluid is communicated from said first port to said high pressure accumulator, and when said pump-motor unit is in said motoring mode, pressurized fluid is communicated from said high pressure accumulator to said first port; said control valve assembly including a valve housing defining a poppet seat and a port in fluid communication with said accumulator, and being characterized by:

(a) a main poppet member defining a control cavity, fluid pressure in said control cavity biasing said main poppet member toward said poppet seat;

(b) substantially all flow between said high pressure accumulator and said first port of said pump-motor unit flowing past said main poppet member and said poppet seat in either said pumping mode or said motoring mode;

(c) a pilot valve assembly having open and closed conditions and operable to control fluid communication from said control cavity to a source of low pressure, in response to an electrical input signal;

(d) a step-orifice valve assembly operable to control fluid communication from said accumulator through said port, defined by said valve housing, to said control cavity, and defining a first, relatively larger flow orifice when fluid pressure in said control cavity is relatively high, and a second, relatively smaller flow orifice when fluid pressure in said control cavity is relatively low, to provide a relatively small flow to said pilot valve assembly.

2. A control valve assembly as claimed in claim 1, characterized by said main poppet member being configured, relative to said poppet seat such that, when the fluid pressure at said port, defined by said valve housing, is substantially equal to the fluid pressure in said control cavity, said poppet member is biased into closed, sealing engagement with said poppet seat.

3. A control valve assembly as claimed in claim 2, characterized by a relatively light compression spring being disposed in said control cavity and operable to assist said fluid pressure in said control cavity to bias said poppet member toward said poppet seat.

4. A control valve assembly as claimed in claim 3, characterized by said poppet member being configured, relative to said poppet seat, to provide an outer poppet area, disposed radially outward from said poppet seat, and in fluid communication with said first port of said pump-motor unit whereby, in said pumping mode, fluid pressure generated by said pump-motor unit acting as a pump, biases said poppet member to an open position, permitting flow from said pump-motor unit to charge said high pressure accumulator.

5. A control valve assembly as claimed in claim 4, characterized by said step-orifice valve assembly being operable, when said pump-motor unit is in said pumping mode, to maintain the fluid pressure in said control cavity substantially equal to the fluid pressure in said fluid port, defined by said valve housing, whereby, when said pump-motor unit ceases pumping pressurized fluid into fluid communication with said outer poppet area disposed radially outward from said poppet seat, said poppet member quickly returns to its closed, sealing engagement with said poppet seat, under the influence of said compression spring.

6. A control valve assembly as claimed in claim 1 characterized by said second, relatively smaller flow orifice being selected such that during operation in said motoring mode, there is a relatively small pilot flow through said smaller flow orifice and to said pilot valve assembly in its open condition.

7. A control valve assembly as claimed in claim 1, characterized by, said pilot valve assembly being sized such that, when said pilot valve assembly is in said open condition, pilot flow through said pilot valve assembly is much greater than the flow through said step-orifice valve assembly, causing a substantial decrease in fluid pressure within said control cavity, thereby causing said step-orifice valve assembly to shift to a position in which the only fluid communication from said accumulator to said control cavity is through said second, relatively smaller flow orifice.

* * * * *